2,853,132

PEST COMBATING COMPOSITION AND METHODS EMPLOYING DIFORMAMIDINE SULFIDES

Richard Sallmann, Binningen, Ernst Beriger, Allschwil, and Max Geiger, Riehen, Switzerland, assignors to Ciba Limited, Basel, Switzerland No Drawing. Application June 8, 1956
Serial No. 590,103

Claims priority, application Switzerland June 17, 1955

11 Claims. (Cl. 167—22)

This invention provides pest combating preparations which contain a salt of a compound of the general formula

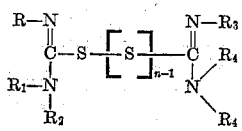

in which each of R, $R_1$, $R_2$, $R_3$, $R_4$ and $R_5$ represents a hydrogen atom or a lower aliphatic hydrocarbon radical advantageously containing 1–4 carbon atoms, such as a methyl, ethyl or allyl group, and in which R and $R_1$, on the one hand, and $R_3$ and $R_4$, on the other, may form part of a heterocyclic ring, for example, they may be ethylene bridges, and $n$ represents a positive whole number not greater than 2.

The compounds used according to this invention are salts of diformamidine disulphide (bis - [amino-iminomethyl]-disulphide) and derivatives thereof, or of diformamidine monosulphide and derivatives thereof.

The salts of diformamidine disulphide and derivatives thereof can be made in known manner by treating thiourea or a derivative of thiourea, for example, N:N-dimethyl-thiourea, diallyl-thiourea or ethylene-thiourea with an oxidising agent, such as chlorine, bromine, iodine or hydrogen peroxide, in the presence of an acid, or by electrolytic means or by the action of an acid chloride, such as sulphuryl chloride.

The salts of diformamidine monosulphide and its derivatives can also be obtained in known manner by condensing cyanamide or a derivative thereof, such as dimethyl-cyanamide, with thiourea or a derivative thereof in the presence of an anhydrous hydrohalic acid.

For the purposes of this invention water-soluble salts are preferred, especially the hydrochlorides. Alternatively, there may be used salts sparingly soluble in water, such as the oxalates. The salts of compounds of the above general formula are distinguished by their good fungicidal action against various molds which attack plants, such molds being for example, *Septoria apii,* Oidium on grapes or on apple trees (*Podosphaera leucotricha*). They are also active against other molds, such for example, as *Aspergillus niger.*

These compounds can be used by the customary methods for combatting pests, for example, by treating the object to be protected with the compound in the form of a dusting powder or spray liquor. Advantageously aqueous solutions are used. The spraying liquors and dusting powders may contain the usual inert fillers or identification agents, for example, kaolin, gypsum or bentonite, or further additions such as sulphite cellulose waste liquor, cellulose derivatives or the like and may contain the usual wetting agents or adherent agents for improving the wetting capacity or adhesive power of the preparations. When salts of compounds of the above general formula with strong acids are used, it is of advantage to add a buffer substance in order to reduce any phytotoxic action. As buffer substances there may be used, for example, borax sodium oxalate, the disodium salt of nitrilo-triacetic acid or chalk. The invention therefore includes more especially pulverulent preparations, which contain a salt of a compound of the above general formula and a buffer substance and, if desired, an inert filler and a wetting agent. The quantity of the buffer substance is advantageously so adjusted that in the production of the spraying liquor the mineral acid used for salt formation is neutralised.

A salt of the compound of the above general formula may be the sole active substance in a pest combating preparation or it may be present together with an insecticide and/or another fungicide. The preparations can be used for plant portection by spraying or dusting methods.

The following examples illustrate the invention, the parts being by weight unless otherwise stated and the relationship of parts by weight to parts by volume being the same as that of the kilogram to the litre:

Example 1

Celery plants were sprayed with an aqueous solution of 0.5 percent strength of the dihydrochloride of diformamidine disulphide. After 24 hours the plants were infected with the spores of Septoria. The mold was unable to develop on the sprayed plants, whereas it grow strongly on untreated control plants.

The dihydrochloride of diformamidine disulphide can be prepared as follows: 633 parts of thiourea are stirred in an open vessel with 3330 parts by volume of absolute alcohol for ½ hour. 616 parts of sulphuryl chloride are added dropwise to the suspension at 20–30° C., while cooling with water. When the addition is complete, the thick mass is stirred for a further hour at room temperature and is then filtered with suction. The filter residue is washed with absolute alcohol and dried at room temperature in vacuo. The diformamidine disulphate dihydrochlordie (888 parts) so obtained melts at 165–167° C. with decomposition.

Also active against *Septoria apii* are derivatives of diformamidine disulphide, and also salts of diformamidine monosulphide and derivatives thereof, which can be prepared, for example, as follows:

(a) 11.6 parts of allyl thiourea are dissolved in 70 parts by volume of dry chloroform at 30° C. To the resulting solution is added dropwise at 30–33° C. a solution of 7.5 parts of sulphuryl chloride in 10 parts by volume of chloroform, while cooling with water. Diallyl-diformamidine disulphide dihydrochloride instantly precipitates in the form of a sticky yellowish white mass. The solvent is poured off and the mass is thoroughly kneaded in fresh chloroform. For further purification the product may be reprecipitated from a mixture of alcohol and ether. The dihydrochloride dissolves very well in water. An aqueous solution of the product, when heated, becomes turbid due to the separation of sulphur.

(b) 14.5 parts of N:N-dimethyl-thiourea are suspended in 45 parts by volume of chloroform. A solution of 10.3 parts of sulphuryl chloride in 15 parts by volume of chloroform is added dropwise at 20–30° C., while stirring. When the addition is complete, the mixture is stirred for a further hour at room temperature, and then the solvent is removed in vacuo. The residue is taken up in 25 parts by volume of chloroform and the solution is evaporated to dryness. In this manner there are obtained 14.3 parts of the dihydrochloride in the form of a white powder melting at 160–162° C.

(c) 10.1 parts of N:N'-ethylene-thiourea are suspended in 40 parts by volume of chloroform and a solution of 7.4 parts of sulphuryl chloride in 10 parts by volume of chloroform is added dropwise at 20–30° C. The solvent is then distilled off in vacuo. The residue is taken up in a small quantity of chloroform and the solution is evaporated to dryness in vacuo. There is obtained a white crystalline powder (14.5 parts), which sinters at 127° C. and decomposes at 233–236° C.

(d) 11.6 parts of N:N:N'-trimethyl-thiourea are dissolved in 25 parts by volume of chloroform. To the solution is added dropwise at 20–30° C. a mixture of 7.4 parts of sulphuryl chloride and 10 parts by volume of chloroform. The chloroform is then removed at 50° C. in vacuo, the residue is taken up in chloroform (it does not dissolve well), and the solvent is evaporated in vacuo. There remain behind 15.1 parts of a viscous yellowish mass, which dissolves very well in water and aqueous solutions of which become turbid due to the separation of sulphur when heated.

(e) 365 parts of anhydrous hydrochloric acid in the form of a 10 N-solution in methanol are run into a mixture of 200 parts of cyanamide, 380 parts of thiourea and 400 parts of methanol, while cooling and stirring well. Diformamidine sulphide dihydrochloride is formed by an exothermic reaction. It precipitates in a crystalline form and can be separated by filtration after the reaction. The yield amounts to 850 parts (=90%). The product melts at 161° C. The two molecules of combined hydrogen chloride can be accurately determined by dissolving the product in water and titrating with caustic soda solution using phenolphthalein as indicator.

(f) 75 parts by weight of hydrochloric acid gas are introduced into a mixture of 70 parts of dimethyl-cyanamide and 76 parts of thiourea in 500 parts of isopropyl alcohol, while stirring. The temperature must be maintained at about 30° C. by external cooling. After a little time finely crystalline N:N-dimethyl-diformamidine monosulphide dihydrochloride begins to precipitate, and the precipitation terminates only after several hours. The precipitated product is filtered off with suction and dried. The yield amounts to about 200 parts, i. e. about 90 percent of the theoretical yield. The product melts at 147° C. with decomposition.

*Example 2*

Celery plants were sprayed only on the undersides of the leaves with a solution of 0.5 percent strength of the dihydrochloride of diformamidine disulphide. After 24 hours the upper sides of the leaves were infected with Septoria. The action against the mold was 75 percent as compared with the untreated control plants.

A fungicidal action was found when celery plants grown in pots were watered with a solution of 0.1 percent strength of the same product. This experiment shows that the product also has a systemic action.

*Example 3*

A spraying liquor was prepared which contained, per litre, 1 gram of the hydrochloride of diformamidine disulphide, 1 gram of borax and 0.2 gram of an ion-free wetting agent, for example, the condensation product of 8 mols of ethylene oxide with 1 mol of para-tertiary octylphenol. An apple tree, which was heavily infested with true apple mildew, was thoroughly sprayed with the aforesaid spraying liquor. After a few weeks the affected shoots had been cured.

Vine cuttings were sprayed with the same liquor in a greenhouse. The treated vines remained free from Oidium for about 3 weeks, whereas the untreated control plants were heavily attacked.

*Example 4*

5 parts of DDT, 10 parts of dihydrochloride of diformamidine monosulphide, 7 parts of sodium oxalate, 10 parts of powdered sulphite cellulose waste liquor, 1 part of the condensation product of 12 mols of ethylene oxide with 1 mol of dodecyl-mercaptan and 67 parts of kaolin were mixed together. In this manner an insecticidal and fungicidal powder was obtained which can be used for the preparations of spraying liquors.

Instead of DDT there may be used another chlorinated insecticide, for example, Dieldrin or Aldrin, or a chlorinated terpene, or a phosphoric acid ester, for example, diethyl para-nitrophenyl thiophosphate. Instead of kaolin, another filler such as bentonite or diatomaceous earth may be used. Instead of the condensation product of 12 mols of ethylene oxide with 1 mol of dodecyl mercaptan, there may be used as wetting agent any non-ionic wetting or emulsifying agent, for example, ethylene oxide derivatives of aliphatic alcohols, amines or carboxylic acids of high molecular weight, for example, the product obtained from 1 mol of octadecyl alcohol and 30 mols of ethylene oxide or the product obtained from 1 mol of dodecylamine and 10 mols of ethylene oxide. Cation-active wetting or emulsifying agents may also be used, for example, cetylpyridinium chloride or dodecyl-diethyl-benzyl ammonium chloride.

*Example 5*

90 parts of finely ground sulphur were mixed with 10 parts of the oxalate of diformamidine disulphide. In this manner a fungicidal dusting powder was obtained which was active against Oidium and scab.

The oxalate used in this example may be prepared as follows: 12.6 parts of oxalic acid and 7.6 parts of finely powdered thiourea are stirred in 60 parts of water. While cooling with ice, there is added dropwise at 15–20° C. a solution of 7 parts by volume of hydrogen peroxide solution of 30 percent strength in 10 parts by volume of water. The whole is stirred for a further 2 hours at room temperature; the dense precipitate of diformamidine disulphide dioxalate is then filtered off. By drying the product in vacuo at 40–50° C. there are obtained 10.65 parts of a white powder melting at 131–132° C.

*Example 6*

The following are further examples of preparations containing an active substance and a buffer.

(1) 2.23 parts of diformamidine disulphide dihydrochloride are thoroughly mixed with 2.35 parts of finely powdered and sieved sodium nitrilo-triacetate. An aqueous solution of the mixture containing 0.5 percent of active substance has a pH value of 3.6. After 5 hours the solution is still clear, but after 20 hours sulphur precipitates.

(2) 2.23 parts of diformamidine disulphide dihydrochloride are mixed with 1.52 parts of the disodium salt of sulpho-acetic acid. An aqueous solution of the resulting mixture having a content of 0.5 percent of active substance has a pH value of 3.7. The solution is still clear after 5 hours.

(3) 5 parts of diformamidine disulphide dihydrochloride are mixed with 8 parts of the complex salt of iron and nitrilotriacetic acid. An aqueous solution of the mixture containing 0.5 percent of active substance has a pH value of 3.8.

(4)

50 parts of diformamidine monosulphide dihydrochloride,
20 parts by weight of kaolin or talc,
26 parts of finely ground chalk and
4 parts of an ion-free wetting agent.

100 parts

What is claimed is:

1. A fungicidal composition which contains as the active ingredient an acid addition salt of a diformamidine of the general formula

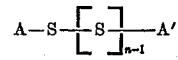

wherein A and A' are formamidine radicals selected from the group consisting of

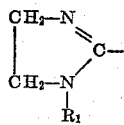

radicals and

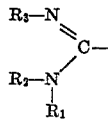

radicals, $R_1$, $R_2$ and $R_3$ representing members selected from the group consisting of hydrogen atoms and saturated and ethylenically unsaturated aliphatic hydrocarbon radicals containing 1 to 4 carbon atoms, $n$ being an integer of at the most 2, in admixture with a solid pulverulent carrier.

2. A fungicidal composition which contains as the active ingredient an acid addition salt of a diformamidine of the general formula

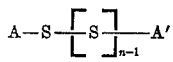

wherein A and A' are formamidine radicals selected from the group consisting of

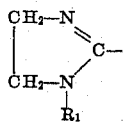

radicals, and

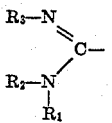

radicals, $R_1$, $R_2$ and $R_3$ representing members selected from the group consisting of hydrogen atoms and saturated and ethylenically unsaturated aliphatic hydrocarbon radicals containing 1 to 4 carbon atoms, $n$ being an integer of at the most 2, in admixture with a solid pulverulent carrier and a salt of a strong base with a weak acid.

3. The method of controlling fungi on plants which comprises applying to plants that are subject to attack by fungi a fungicidal amount of an acid addition salt of a diformamidine of the general formula

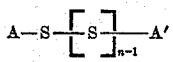

wherein A and A' are formamidine radicals selected from the group consisting of

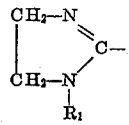

radicals and

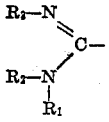

radicals, $R_1$, $R_2$ and $R_3$ representing members selected from the group consisting of hydrogen atoms and saturated and ethylenically unsaturated aliphatic hydrocarbon radicals containing 1 to 4 carbon atoms, $n$ being an integer of at the most 2.

4. The method of controlling fungi on plants which comprises applying to plants that are subject to attack by fungi a fungicidal amount of an acid addition salt of diformamidine disulfide.

5. The method of controlling fungi on plants which comprises applying to plants that are subject to attack by fungi a fungicidal amount of an acid addition salt of diformamidine monosulfide.

6. The method of controlling fungi on plants which comprises applying to plants that are subject to attack by fungi a fungicidal amount of an aqueous solution of an acid addition salt of diformamidine disulfide.

7. The method of controlling fungi on plants which comprises applying to plants that are subject to attack by fungi a fungicidal amount of an aqueous solution of an acid addition salt of diformamidine monosulfide.

8. A fungicidal composition which contains as an active ingredient the dihydrochloride of diformamidine disulfide in admixture with a solid pulverulent carrier.

9. A fungicidal composition which contains as an active ingredient the dihydrochloride of diformamidine monosulfide in admixture with a solid pulverulent carrier.

10. A fungicidal composition which contains as an active ingredient the dihydrochloride of diformamidine disulfide in admixture with a solid pulverulent carrier and sodium oxalate.

11. A fungicidal composition which contains as an active ingredient the dihydrochloride of diformamidine monosulfide in admixture with a solid pulverulent carrier and sodium oxalate.

References Cited in the file of this patent

Chem. Abstr., Sahasrabudhey, vol. 48, p. 2599 (1957).
A Catalogue of Insecticides and Fungicides, Frear, Chronica Botanica Comp., vol. 1, p. 58 (1948).